United States Patent [19]

Burgess

[11] Patent Number: 4,876,454
[45] Date of Patent: Oct. 24, 1989

[54] RADIATION DETECTOR

[75] Inventor: Peter H. Burgess, Oxfordshire, England

[73] Assignee: National Radiological Protection Board, Oxfordshire, England

[21] Appl. No.: 138,372

[22] PCT Filed: Mar. 3, 1987

[86] PCT No.: PCT/GB87/00148
§ 371 Date: Oct. 15, 1987
§ 102(e) Date: Oct. 15, 1987

[87] PCT Pub. No.: WO87/05403
PCT Pub. Date: Sep. 11, 1987

[30] Foreign Application Priority Data

Mar. 5, 1986 [GB] United Kingdom ............... 8605394

[51] Int. Cl.[4] .................... G01T 1/02; H01L 31/00
[52] U.S. Cl. .................... 250/370.14; 250/370.01; 250/370.07
[58] Field of Search ............... 250/370.14, 370.07, 250/370.01, 349, 338.4

[56] References Cited

U.S. PATENT DOCUMENTS 4,110,621 8/1978 Horn .................... 250/361 R

FOREIGN PATENT DOCUMENTS 104876 6/1982 Japan .................... 250/370.07
1014682 12/1965 United Kingdom .
8705403 9/1987 World Int. Prop. O. ...... 250/370.07

OTHER PUBLICATIONS

Article: "Silicon diode dosimetry", Dixon et al., *Int. J. Applied Radiation and Isotopes*, vol. 33, 1982 (Oxford, GB), pp. 1171–1176.
Article: "A silicon-diode pocket radiation chirper", Nowotny, *Health Physics*, vol. 44, Feb. 1983, pp. 158–160.

*Primary Examiner*—Janice A. Howell
*Assistant Examiner*—Constantine Hannaher
*Attorney, Agent, or Firm*—Fitch, Even, Tabin & Flannery

[57] ABSTRACT

A radiation meter comprises two p-i-n photodiodes (1,3) each disposed to operate in a self-biasing mode. The larger diode has an attenuating shield (2) and the outputs of the diodes are combined. The invention is intended for active personal dose meters for the same general purpose as Geiger-Muller tubes.

9 Claims, 1 Drawing Sheet

RADIATION DETECTOR

BACKGROUND OF THE INVENTION

The present invention relates to a radiation detector which is particularly though not exclusively intended for use in dosemeters, for example small, active personal dosemeters for the same general purposes as Geiger-Muller tubes.

The object of the present invention is to provide novel, and at least in some respects, improved detection of radiation.

SUMMARY OF THE INVENTION

The present invention is based on the use, in a radiation meter comprising a detector for generating pulses in response to incident radiation and means for indicating the rate of pulses which exceed a threshold, of a detector comprising at least one PIN photodiode structure disposed to operate in a self biasing mode.

According to a further aspect of the invention, a detector for generating pulses in response to incident radiation comprises two PIN photodiodes each disposed to operate in a self biasing mode, one of the diodes having an effective sensitive area substantially larger than that of the other and being provided with means for attenuating radiation incident thereon. Preferably the diodes are selected such that the variation of output with incident radiation is compensated by the output from the other. There may be provided means for reducing the amplitude of pulses produced by the larger diode; this means may comprise a capacitor in series with that diode.

The aforementioned means for attenuating may comprise a metallic screen, preferably in the form of a brass cap or shield.

DETAILED DESCRIPTION

Figure 1:
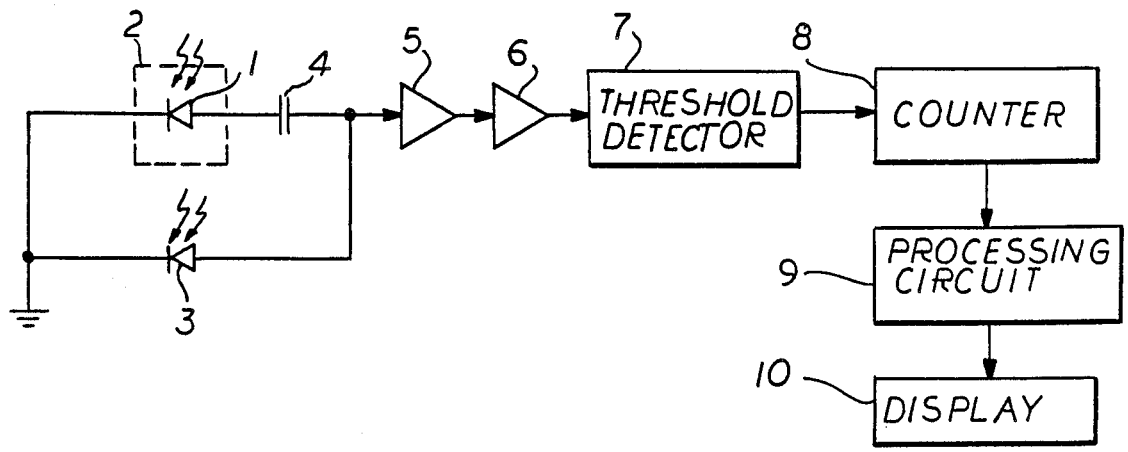
FIG. 1 illustrates schematically a radiation meter incorporating a detector according to the invention.

FIG. 1 illustrates by way of example a circuit comprising a detector, constituted in this embodiment by two silicon PIN photodiodes 1 and 3, together with other circuit elements forming a complete meter. In this particular embodiment of the invention the other elements comprise a capacitor 4 in series with the diode 1, a preamplifier 5 which is arranged to receive the combined output of the diodes 1 and 3, an amplifier 6, a threshold detector 7, and a counter and timer 8, the elements 5 to 8 constituting, in this embodiment, a means for indicating the rate of pulses which exceed a threshold. The counter may be coupled to a processing circuit 9, which in known manner may produce denoting the dose rate and the total dose and provide an alarm signal if either the dose rate or the dose exceeds a threshold. These signals may control respective sections of a display device 10 (such as a liquid crystal display).

Considering first the diode 1, which is preferably a silicon photodiode having an intrinsic layer between appropriately doped P and N regions, it will be understood that photon radiation incident on the diode can generate energetic electrons from photoelectric and Compton interactions with the silicon crystal lattice. Such electrons then lose energy by interaction with the crystal lattice and can generate electron-hole pairs within the intrinsic layer. The electrons thus generated are separated by the inherent field within the device to form a charge pulse which can be amplified by the preamplifier 5 and the amplifier 6. In this embodiment of the invention, if the charge pulse is in excess of said threshold as determined by the threshold detector 7, the pulse may be counted.

Although a device employing only a single PIN diode in a self-biassing mode has some utility, it exhibits a response which is substantially non-uniform with variation in radiation energy and it is preferably to provide compensation by means of at least one further diode in order to obtain a combined output which is substantially uniform with variation of radiation energy. For this purpose the diode 1, which may be a BPX61 PIN diode, is provided with means for attenuating incident radiation, preferably constituted by a brass cap, typically of the order of 2.5 millimeters thick. The cap is schematically illustrated in FIG. 1 by the dashed line 2. The provision of such a cap would normally result in a large underestimate for radiations of energy less than, for example, 150 keV. To compensate for this the output from a smaller diode 3 is added to that from the larger diode 1. The diode 3, which may be a BPX65 PIN diode of which the glass lens is removed to improve the low energy response, may have, for example, approximately 14% of the effectively sensitive area of the diode 1. In addition, a capacitor 4 may be disposed electrically in series with the diode 1 so as to reduce the signal amplitude from the diode 1. In this manner the falling output, from the larger diode, combined with the rising output, from the smaller diode, produces a response which is substantially uniform with respect to radiation energy. For the particular examples of diode as stated above, the capacitor may be a 180 pF capacitor.

Figure 2:
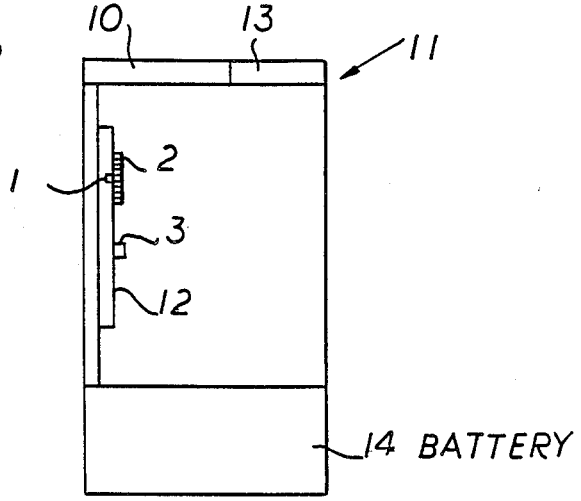
FIG. 2 illustrates one possible physical configuration of the components in the meter according to FIG. 1.

FIG. 2 illustrates by way of example the physical arrangement of a meter 11 which is electrically arranged according to FIG. 1. The diodes 1 and 3 may be incorporated into an integrated circuit 12, which contains all the detection, amplifying and processing stages of the device.

The larger of the two diodes is covered by the brass shield 2. The two diodes should be mounted at least 6 mm apart to reduce shadowing by the brass shield 2 of the unshielded diode 3 from low energy radiation. The surface of the integrated circuit in which the diodes are incorporated faces away from the body of the wearer. The shield may comprise a disc which is mounted centrally over the diode 1 and is of significantly larger area than the active area of the diode 1. This configuration has in essence the same properties as the shield described with reference to FIG. 1. The display 10, is preferably mounted in the top face of the meter for the sake of good visibility. If desired an audible alarm device 13 (driven by the circuit 9 which is incorporated in the integrated circuit 12) may be disposed adjacent the display 10 and may be triggered by the alarm signal. A battery 14, preferably of sufficient capacity to last at least one year, may be disposed in a recess at the bottom of the meter.

A detector as described may readily be arranged to provide a pulse output which at a suitable threshold is substantially independent of photon energy and angle of incidence for photons of energy greater than approximately 40 keV. Such a device has a sensitivity suitable for employment of the device in an active personal dosemeter.

A detector as described is capable of providing improved energy response and polar response with respect to known energy compensated Geiger-Muller tubes and offer further the advantages of robustness, consistency, cheapness of ease of manufacture and a more accurate background response, in addition to avoiding any need for high voltage electrical supplies

I claim:

1. A radiation detector for generating pulses in response to incident radiation characterised by two PIN photodiodes (1,3) each disposed to operate in a self biasing mode, one of the diodes having an effective sensitive area substantially larger than that of the other and the larger area diode being provided with means (2) for attenuating radiation incident thereon, and means (5) for combining the output of each diode.

2. A radiation detector according to claim 1 in which the means (2) for attenuating comprises a thin metallic member.

3. A radiation detector according to claim 2 further comprising means (4) for reducing the amplitude of pluses produced by the larger diode.

4. A detector according to claim 3 further comprising means (7,8) for counting pulses which exceed a threshold in the said output.

5. A detector according to claim 2 further comprising means (7,8) for counting pulses which exceed a threshold in the said output.

6. A radiation detector according to claim 1 further comprising means (4) for reducing the amplitude of pulses produced by the larger diode.

7. A detector according to claim 6 in which the said means (4) for reducing comprises a capacitor electrically in series with a larger diode.

8. A detector according to claim 6 further comprising means (7,8) for counting pulses which exceed a threshold in the said output.

9. A detector according to claim 1 further comprising means (7,8) for counting pulses which exceed a threshold in the said output.

* * * * *

UNITED STATES PATENT AND TRADEMARK OFFICE
CERTIFICATE OF CORRECTION

PATENT NO. : 4,876,454

DATED : October 24, 1989

INVENTOR(S) : Peter H. Burgess

It is certified that error appears in the above-identified patent and that said Letters Patent is hereby corrected as shown below:

Column 2, line 13, change "preferably" to --preferable--.

Column 3, line 9, after "supplies" insert a period.

Claim 3, column 4, page 3, change "pluses" to --pulses--.

Signed and Sealed this

Eighteenth Day of December, 1990

Attest:

HARRY F. MANBECK, JR.

*Attesting Officer*     *Commissioner of Patents and Trademarks*